Figure 1:
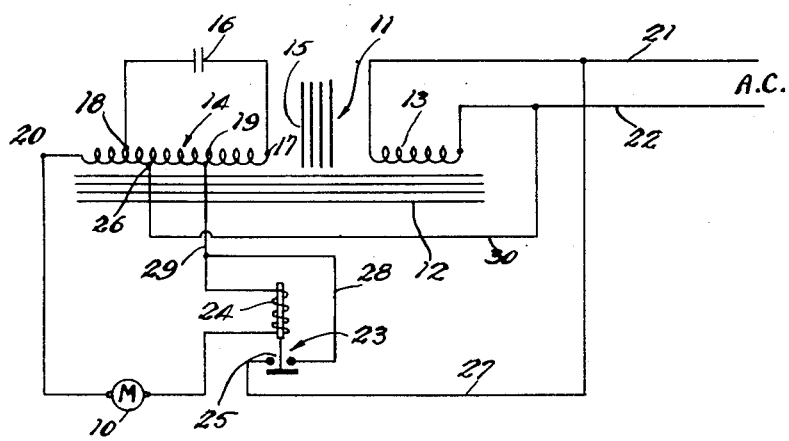

July 27, 1948.   J. G. SOLA   2,445,976

MOTOR CONTROL SYSTEM

Filed Feb. 19, 1947

INVENTOR.
Joseph G. Sola.
BY
Thiess, Olson & Mecklenburger
Attys

Patented July 27, 1948

2,445,976

UNITED STATES PATENT OFFICE 2,445,976

MOTOR CONTROL SYSTEM

Joseph G. Sola, River Forest, Ill., assignor to Sola Electric Company, Chicago, Ill., a corporation of Delaware Application February 19, 1947, Serial No. 729,563

8 Claims. (Cl. 318—414)

This invention relates to motor control systems, more particularly to systems for providing constant-voltage energization of motors from sources of alternating current characterized by fluctuating voltage, and the invention has for an object the provision of simple, reliable and inexpensive systems of this character.

In the operation of various types of motor-driven equipment, particularly equipment driven by single phase fractional horsepower motors, various difficulties, as for example stalling of the motor and failure to restart under load, may result from large fluctuations or dips in the supply voltage such as may be encountered in rural areas supplied from local or private power stations. In an attempt to overcome the results of such voltage fluctuations it has been proposed to energize the driving motors of such equipment from so-called constant-voltage transformers capable of maintaining a substantially constant secondary voltage over a wide range of fluctuations of the primary voltage.

One type of constant-voltage transformer particularly suited for use in such applications, because of its reliability and simplicity of construction, is described and broadly claimed in my prior Patent No. 2,143,745, issued January 10, 1939, and entitled Constant voltage transformer.

As more fully set forth in my prior patent, constant-voltage transformers embodying the principles of the invention described and claimed therein are characterized by high reluctance magnetic shunts disposed between the primary winding and the constant-voltage or load winding, which latter winding forms a part of an oscillatory or resonant circuit for maintaining the constant voltage output. An inherent characteristic of such transformers resides in their inability to establish and maintain the oscillatory or resonant condition of operation when subjected to abnormal overloads in the neighborhood of short circuit. Consequently, if the motor to be controlled is energized from a constant-voltage transformer of this type having just sufficient capacity or rating to energize the particular motor during running operation at full load with the usual allowance for normal overload conditions, the transformer will be incapable of supplying the high inrush starting current required by the motor when started under load. In other words, the constant-voltage characteristics of transformers of the type described and claimed in my prior patent collapses sharply on overload thereby limiting the energy available to the load circuit and rendering the transformer incapable of starting a motor requiring a high inrush starting current in excess of the maximum load for which the transformer is designed.

With the above characteristics of the equipment in mind, it has been proposed to utilize a conventional autotransformer for starting purposes and to switch over to a constant-voltage transformer after the motor has attained its normal running speed. Prior attempts to accomplish the switchover have involved the use of conventional definite time relays and the like, but have not proven successful due to the tendency of the motor to stall or decrease in speed during the switchover, whereupon the constant-voltage transformer may fail to pick up the load. Furthermore, definite time relays of this type are not entirely reliable and the motor may fail to come up to speed during the time interval provided by the relay. In my copending application, Serial No. 655,963, filed March 21, 1946, entitled Motor control systems, there is described and claimed a motor starting system wherein relay means having a voltage responsive coil and a current responsive coil are arranged to respond selectively to the electrical characteristics of a transformer having an auto-transformer section and a constant-voltage section. The voltage coil of the relay means is effective to close the relay contacts initially to connect the motor to the auto-transformer section for starting, and the contacts are maintained closed by the relay current coil until the motor attains a predetermined speed whereupon the contacts open to disconnect the auto-transformer section, whereby the motor is energized from the constant voltage section during running operation. While the system described and claimed in my copending application is in general satisfactory, operating conditions may be encountered wherein the relay means may chatter or flutter, resulting in improper energization of the motor. Accordingly, it is a further object of this invention to provide an improved and simplified motor control system of the character indicated wherein the constant-voltage transformer is controlled by a single coil relay to provide auto-transformer starting and constant voltage running operation without recourse to additional transformer windings or multiple coil control relays.

In carrying out the invention in one form, a motor control system is provided comprising a constant-voltage transformer which is incapable of supplying from the constant-voltage winding the inrush starting current required by the motor, and the motor is permanently connected across the constant-voltage winding for energization therefrom. In order to start the motor, means are provided for selectively connecting a portion of the constant-voltage winding to the source of energy to form an auto-transformer independent of the primary winding of the constant-voltage transformer for starting purposes, the control means being operable to disconnect the secondary winding from the source when the motor attains a predetermined speed. More particularly, the constant-voltage transformer is of the type having an output voltage characteristic that is substantially constant over the normal load range of the transformer and that collapses sharply on overload so as to limit the energy available to the load circuit, and the motor which is connected to the secondary winding imposes on the transformer during starting a load in excess of the normal load range for which the transformer is designed. The control means for effecting auto-transformer starting and constant voltage running operation of the motor comprises a single coil relay having its energizing winding connected in series circuit relation with the motor and the secondary winding of the transformer, the energizing winding of the relay being effective upon initial energization of the transformer primary winding to close its contacts and connect a portion of the secondary winding to the source of energy, and being effective when the motor attains a predetermined speed to automatically open the auto-transformer circuit whereupon the motor is energized during running operation by the constant voltage output of the transformer.

Figure 2:
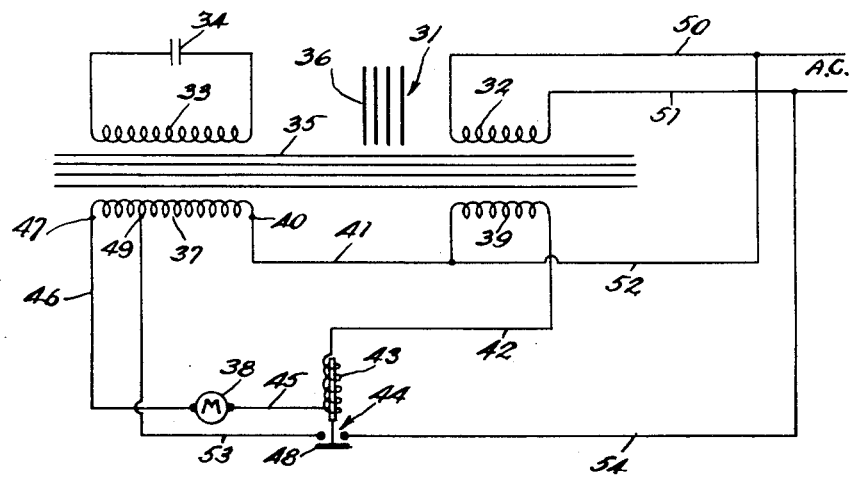

For a more complete understanding of the invention, reference should now be had to the drawings in which:

Fig. 1 is a diagrammatic representation of a motor control system embodying the invention; and Fig. 2 is a similar diagrammatic representation of another motor control system embodying the invention but employing a modified form of constant-voltage transformer.

Referring now to Fig. 1 of the drawings, the invention is shown as embodied in a control system for a motor 10 which may be of any suitable type, such for example as a single phase fractional horse power motor employing split-phase starting. Inasmuch as motors of this general type are well known in the art, the starting and running connections internal to the motor, together with the control relays therefor, have not been illustrated. The energizing transformer diagrammatically illustrated in Fig. 1 and identified by the reference numeral 11 is a constant-voltage transformer of the type disclosed and claimed in my above referred to prior patent and, as more fully explained therein, comprises a magnetic core 12 on which are wound suitable primary and secondary windings 13 and 14, the core structure of the transformer including a high reluctance shunt 15 magnetically disposed between the windings 13 and 14, and the secondary or constant-voltage winding 14 having a condenser 16 connected in circuit therewith for establishing an oscillating or resonant condition which is effective to maintain substantially constant the voltage across the winding 14 regardless of fluctuations in the voltage imposed on the primary winding 13 so long as the load on the transformer does not exceed the normal load range for which the transformer is designed. An inherent characteristic of constant-voltage transformers of this type resides in the ability of the transformer to automatically limit the amount of energy available to the load circuit. Thus, if the load on the constant-voltage transformer is increased beyond its normal rated value, the output voltage suddenly collapses and will not regain its normal value until the load is partially released. Consequently, transformers of this type are incapable of supplying the high inrush starting current required by the motor 10 when the transformer is designed to handle loads on the order of magnitude presented by the motor during running operation.

Although the condenser 16 may be connected across all or any portion of the secondary winding 14, it is shown in the drawings as being connected across the portion of the secondary winding which extends between the terminals or taps 17 and 18, and the motor 10 is permanently connected across the portion of the secondary winding 14 which extends between the terminals or taps 19 and 20. The primary winding 13 of the transformer is connected through suitable leads or conductors 21 and 22 to any suitable source of alternating current, and as heretofore indicated, when the primary winding 13 is energized, the secondary winding, due to the inherent nature of the transformer which includes the high reluctance shunt 15, will not supply full rated voltage to the motor 10 but instead will supply a greatly reduced voltage and consequently the current supplied to the motor from the secondary winding 14 will be insufficient to effect starting.

In accordance with the present invention, the starting of the motor is effected by means of a simple single coil relay 23 having an energizing winding 24 which is connected in series circuit relation with the motor 10 and the section of the secondary winding 14 which extends between the terminals 19 and 20. The relay 23 likewise includes a pair of normally open contacts 25 which are arranged when closed to connect the portion of the secondary winding extending between the terminal 19 and another tap or terminal 26 to the source of alternating current voltage. This circuit, which is controlled by the relay contacts 25, may be traced from the supply conductor 21 through a conductor 27, the relay contacts 25, conductors 28 and 29, the portion of the secondary winding 14 which extends between the terminals 19 and 26, and by way of conductor 30 to the other supply conductor 22. Thus it will be seen that when the relay 23 is closed, a portion of the secondary winding 14 is connected to the source of alternating current so as to form an auto-transformer independent of the primary winding 13 and of the high reluctance shunt 15, which auto-transformer is capable of supplying the inrush starting current required by the motor 10 and of causing acceleration of the motor 10 to its normal running speed.

The primary and secondary windings 13 and 14 and the high reluctance shunt 15 of the transformer 11 are so proportioned that upon initial energization of the primary winding 13 with the motor 10 at a standstill, the secondary winding will supply to the motor 10 a current which is in excess of the normal running current of the motor 10, but which is insufficient to effect starting of the motor. The relay 23 is designed to pick up or close when energized by a current of this magnitude, and consequently, immediately upon energization of the primary winding 13, relay 23 closes to establish the heretofore described auto-transformer circuit. As the motor 10 comes up to speed, the load imposed by the motor upon the transformer 11 gradually decreases, and as soon as the load reaches a value within the normal operating range of the transformer, the heretofore described oscillatory or resonant condition will be established in the secondary portion of the transformer so as to supply and maintain substantially constant the normal output voltage for which the transformer is designed. As soon as the current flowing to the motor decreases to a predetermined value, the relay 23 opens to disconnect the secondary winding from the source of energy and thereafter the motor 10 is energized solely by the constant-voltage output provided by reason of the energization of the primary winding 13.

In a specific example, the transformer 11 was designed to provide on short circuit a secondary current in the neighborhood of six amperes which was in excess of the running current required by the motor 10, but insufficient to effect starting of the motor. Accordingly, the relay 23, which was designed to pick up or close its contacts when energized by a current of five and one-half amperes, and to drop out or open its contacts whenever the energizing current supplied to the winding 24 decreased to a value in the neighborhood of four and one-half amperes, the normal running current of the motor 10 being from two to three and one-half amperes, was effective automatically to connect and disconnect the secondary winding and the source of current in accordance with the current conditions of the motor circuit. From the foregoing description it will be apparent that motor starting systems embodying the present invention provide for automatic starting and running operation of the motor through the use of a single simple relay without recourse to additional windings other than those provided in a standard constant-voltage transformer of the type described in my above referred to prior patent.

As set forth in my prior patent, the constant-voltage output of transformers of the type therein described may be obtained by tapping across all or a portion of the resonant winding to which the condenser 16 is connected, or may be obtained from an additional output winding wound over the condenser winding and insulated from it. Likewise if desire, a compensating winding arranged in inductive relation with the primary winding and connected in opposed series relation to the output winding may be employed for increasing the degree of regulation provided by the constant-voltage transformer. In Fig. 2 of the drawings, I have shown a motor starting system embodying the present invention applied to a constant-voltage transformer 31 employing a separate output winding and a compensating winding of the type discussed in my prior patent. Referring to Fig. 2, the constant-voltage transformer 31 comprises a primary winding 32 and a secondary or resonant winding 33 across which a condenser 34 is connected. The windings 32 and 33 are disposed on a magnetic core 35 having a high reluctance shunt 36, and a separate secondary or output winding 37 is wound on the same portion of the core 35 as the condenser winding 33. In this embodiment of the invention a suitable motor 38 is connected across the output winding 37 in series circuit relation with a compensating winding 39 disposed on the primary portion of the core 35 in inductive relation to the primary winding 32. This motor circuit may be traced from one terminal 40 of the constant voltage or output winding 37 through a conductor 41, the auxiliary winding 39, a conductor 42, the energizing winding 43 of a relay 44, a conductor 45, the motor 38, and by way of a conductor 46 to the opposite terminal 47 of the winding 37.

The relay 44 is identical with the relay 23 of Fig. 1, and the normally open contacts 48 of the relay are arranged when closed to connect a portion of the winding 37 which extends between the terminal 40 and an additional tap or terminal 49 to the source of current represented by the conductors 50 and 51 to which the primary winding 32 is connected. The energizing circuit controlled by the relay contacts 48 may be traced from a supply conductor 50 through conductors 52 and 41, the portion of the secondary winding extending between the taps or terminals 40 and 49, a conductor 53, relay contacts 48, and by way of a conductor 54 to the other supply conductor 51. Inasmuch as the operation of the control system shown in Fig. 2 is identical with the operation described in connection with Fig. 1, a portion of the secondary winding being automatically connected to the source of current by the relay 44 so as to provide a motor starting auto-transformer which effects starting of the motor 38 and which is automatically disconnected when the motor attains a predetermined speed, it is not thought necessary to describe the operation of Fig. 2 in detail.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. In a motor control system for energizing a motor during running from a constant-voltage transformer incapable of supplying from the constant-voltage winding thereof the inrush starting current required by said motor, the combination of means forming a motor circuit permanently connecting said motor to said constant-voltage winding for energization therefrom, means for connecting the primary winding of said transformer to a source of energy, and means operable between open and closed circuit positions for connecting a portion of said constant-voltage winding to said source whereby said constant-voltage winding forms an auto-transformer independent of said primary winding and capable of supplying the inrush starting current to said motor and for disconnecting said portion of said constant-voltage winding from said source when said motor attains a predetermined speed.

2. In a motor control system for energizing a motor during running from a constant-voltage transformer incapable of supplying from the constant-voltage winding thereof the inrush starting current required by said motor, the combination of means forming a motor circuit permanently connecting said motor to said constant-voltage winding for energization therefrom, means for connecting the primary winding of said transformer to a source of energy, and means automatically responsive to current conditions in said motor circuit upon energization of said primary winding for connecting a portion of said constant-voltage winding to said source to form a motor-starting auto-transformer independent of said primary winding and for disconnecting said portion of said constant-current winding from said source when said motor attains a predetermined speed.

3. In a motor control system for energizing a motor during running from a constant-voltage transformer incapable of supplying from the constant-voltage winding thereof the inrush starting current required by said motor, the combination of means forming a motor circuit permanently connecting said motor to said constant-voltage winding for energization therefrom, means for connecting the primary winding of said transformer to a source of energy, and current responsive means energizable from said motor circuit upon energization of said primary winding for selectively connecting a portion of said constant-voltage winding to said source and disconnecting said portion from said source whereby said constant-voltage winding serves as an auto-transformer to start said motor independently of said primary winding and is energized solely from said primary winding during normal running of said motor.

4. In a motor control system for energizing a motor during running from a constant-voltage transformer incapable of supplying from the constant-voltage winding thereof the inrush starting current required by said motor, the combination of means forming a motor circuit permanently connecting said motor to said constant-voltage winding for energization therefrom, means for connecting the primary winding of said transformer to a source of energy, and normally open relay means including an energizing winding connected in said motor circuit, said relay means automatically operating to a closed circuit position upon energization of said primary winding to connect a portion of said constant-voltage winding to said source thereby to form a motor-starting auto-transformer independent of said primary winding, said relay means returning to normal open position when said motor attains a predetermined speed.

5. A motor control system comprising a transformer of the type having an output voltage characteristic that is substantially constant over the normal load range of said transformer and that collapses sharply on overload thereby limiting the energy available to the load circuit, said transformer having a primary winding energizable from a source of alternating current and a secondary winding, a motor connected to said secondary winding and imposing on said transformer during starting a load in excess of said normal load range whereby said transformer is incapable of supplying the inrush starting current required by said motor, and means operable between open and closed circuit positions for connecting a portion of said secondary winding to said source to form an auto-transformer independent of said primary winding to start said motor and for disconnecting said portion from said source when said motor attains a predetermined speed.

6. A motor control system comprising a transformer of the type having an output voltage characteristic that is substantially constant over the normal load range of said transformer and that collapses sharply on overload thereby limiting the energy available to the load circuit, said transformer having a primary winding energizable from a source of alternating current and a secondary winding, means forming a motor circuit permanently connecting a motor to said secondary winding, said motor during starting imposing on said transformer an overload whereby said transformer is incapable of supplying the inrush starting current required by said motor, and means automatically responsive to current conditions in said motor circuit upon energization of said primary winding for connecting a portion of said secondary winding to said source to form an auto-transformer independent of said primary winding to start said motor and for disconnecting said portion from said source when said motor attains a predetermined speed.

7. A motor control system comprising a transformer of the type having a primary and a secondary winding with a high reluctance shunt magnetically disposed therebetween and condenser means connected across said secondary winding for establishing under normal loading a resonant condition of operation to maintain the secondary voltage substantially constant regardless of fluctuations in the primary voltage, a motor connected across said secondary winding, relay means having a pair of normally open contacts and having an energizing winding connected in series circuit relation with said motor and secondary winding, said relay winding being effective upon energization of said primary winding with said motor at a standstill to close said contacts, and means including said contacts for connecting a portion of said secondary winding to the primary voltage source to form a motor-starting auto-transformer independent of said primary winding and said high reluctance shunt, said relay winding permitting opening of said contacts when said motor attains a predetermined speed.

8. A motor control system comprising a transformer of the type having a primary and a secondary winding with a high reluctance shunt magnetically disposed therebetween and condenser means connected across said secondary winding for establishing under normal loading a resonant condition of operation to maintain the secondary voltage substantially constant regardless of fluctuations in the primary voltage, said transformer being incapable of maintaining said resonant condition and said substantially constant voltage under abnormal overloads, a motor connected across said secondary winding and imposing on said transformer during starting an abnormal overload, normally open relay means responsive to the current supplied to said motor by said secondary winding and adapted to close in response to the limited current supplied when said primary winding is energized with said motor at a standstill, and means effective upon closure of said relay means to connect a portion of said secondary winding to the source of primary voltage to provide a motor-starting auto-transformer independent of said primary winding and said shunt, said relay means automatically returning to normal open position when said motor reaches a predetermined speed sufficient to permit establishment of said resonant condition and said substantially constant voltage for energizing said motor during normal running operation.

JOSEPH G. SOLA.